UNITED STATES PATENT OFFICE.

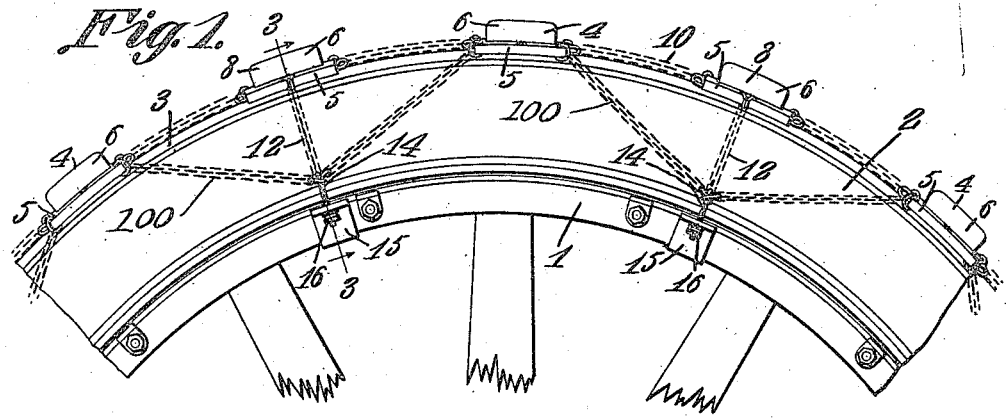

WILLIAM McMEEKIN, OF GALVA, ILLINOIS.

GUIDE-CHAIN.

1,189,599.  Specification of Letters Patent.  Patented July 4, 1916.

Application filed February 9, 1916. Serial No. 77,304.

*To all whom it may concern:*

Be it known that I, WILLIAM McMEEKIN, a citizen of the United States, residing at Galva, in the county of Henry and State of Illinois, have invented a new and useful Guide-Chain, of which the following is a specification.

The device forming the subject matter of this application is adapted to be applied to the tires of the front wheels of an automobile, for the purpose of guiding the wheels, thus preventing the wheels from slipping or skidding laterally.

The invention aims to provide a device of the sort above mentioned which will be simple in construction, and at the same time, will possess a maximum efficiency in preventing skidding.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows in side elevation, a portion of a tire and wheel to which the device forming the subject matter of this application has been applied; Fig. 2 is a top plan view of the structure shown in Fig. 1; Fig. 3 is a cross section taken approximately on the line 3—3 of Fig. 1; Fig. 4 is a fragmental cross section taken approximately on the line 4—4 of Fig. 2.

In the accompanying drawings, the numeral 1 indicates a wheel rim and the numeral 2 indicates a tire of any desired sort carried by the rim 1.

In carrying out the present invention, the tire 2 is circumscribed by a flexible tread 3, the ends of which may be connected in any desired manner (not shown). The flexible tread strip 3 may be made of leather, rubber, or any other composition or substance having the desired characteristics. Mounted on the flexible tread strip 3 are anti-skidding elements 4 ordinarily made of metal, each anti-skidding element 4 comprising a base plate 5 and a boss 6. By means of rivets 7 or other securing elements adapted to a like end, the base plate 5 of the anti-skidding elements 4 are secured to the flexible tread strip 3. Alternating with the anti-skidding elements 4 are anti-skidding elements 8 which need not be described in detail, since, like the anti-skidding elements 4, they comprise a base plate and a frusto-tetragonal boss. The anti-skidding elements 8 are not secured to the flexible tread strip 3 but are connected with the wheel rim 1 and the tire 2 in a manner to be described hereinafter.

The base plates of the anti-skidding elements 4 and 8 are provided in their ends with openings 9 adapted to receive the extremities of chains 10 or other flexible elements which are adapted to coact with the bosses 6 to prevent the wheel from skidding laterally. In the side portions of the base plates of the anti-skidding elements 8, openings 11 are formed, the openings 11 receiving the ends of chains 12 passed along the sides of the tire 2 and connected to eye bolts 14 passing through a rim engaging yoke 15, nuts 16 being threaded onto the ends of the eye bolts 14, the nuts coacting with the ends of the yoke 15. Diagonal chains 100 connect the corners of the base plates of the anti-skidding elements 4 with the eye bolts 14. The chains 100 may be omitted.

Attention is directed to the fact that when a wheel is equipped with the anti-skidding device forming the subject matter of this application, the wheel will be completely surrounded in the median plane of the wheel, whereby a continuous line of elements, represented by the bosses 6 and the chains 9, will prevent the wheel from skidding laterally.

Owing to the fact that the alternate anti-skidding elements, to wit, the anti-skidding elements 4, only, are secured to the flexible tread strip 3, the strip will accommodate itself readily to the configuration of the tire 2. It is within the contemplation of the invention that the tread strip 3 shall be resilient, and when such a construction is resorted to, the proper elongation of the tread strip may be brought about readily, owing to the fact that the anti-skidding elements 8 are not secured to the tread strip, the tread strip stretching longitudinally beween the pairs of anti-skidding elements 4.

It is not mandatory that the chains 12 be employed for securing the tread strip 3 and parts carried thereby to the tire 2. Any suitable means may be provided for holding the tread strip in place.

Having thus described the invention, what is claimed is:—

In a device of the class described, a flexible tread strip; anti-skidding members superposed on the tread strip; flexible elements connecting the anti-skidding members; means for securing alternate anti-skidding members to the flexible tread strip; the other, alternate anti-skidding members being free to move with respect to the tread strip; and means for securing the free anti-skidding elements to a rim.

In testimony that I claim the foregoing as my own, I have hereto affixed my signature in the presence of two witnesses.

WILLIAM McMEEKIN.

Witnesses:
CLARENCE H. HAWKS,
WESLEY J. SODERBERG.